May 7, 1935. N. H. BRADLEY 2,000,212
GUARD
Filed July 26, 1933
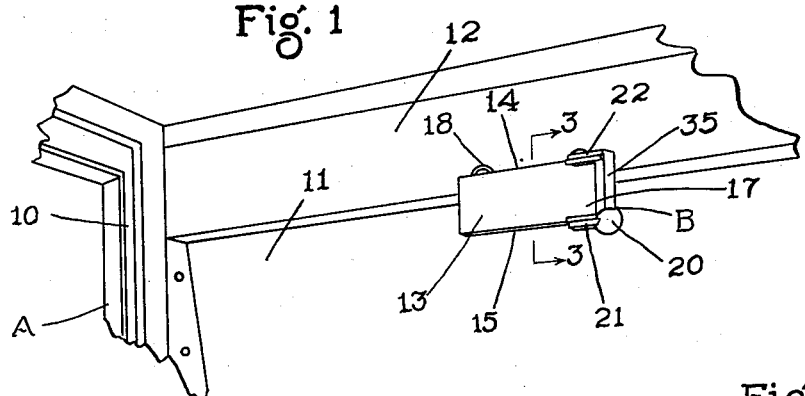
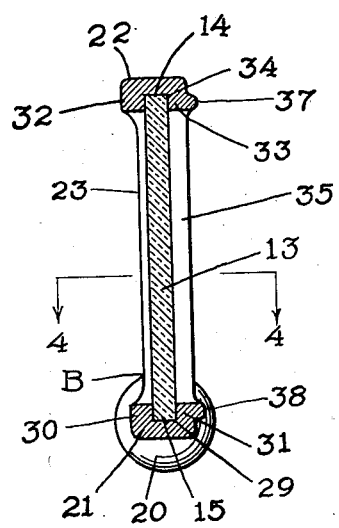
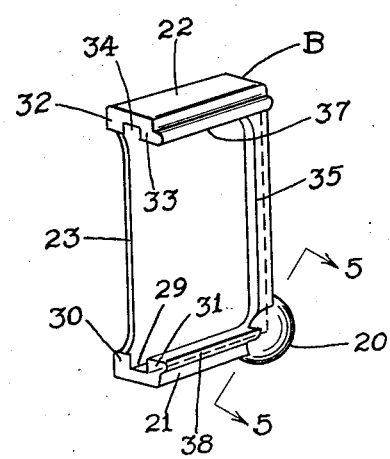
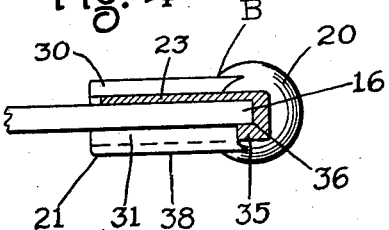
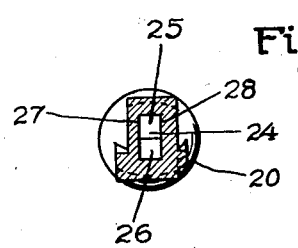
Inventor
Neil H. Bradley
By Caswell & Lagaard
Attorneys Patented May 7, 1935

2,000,212

UNITED STATES PATENT OFFICE 2,000,212

GUARD

Neil H. Bradley, Minneapolis, Minn.

Application July 26, 1933, Serial No. 682,227

6 Claims. (Cl. 88—73)

My invention relates to guards and has for its object to provide a guard capable of being applied to a plate-like member to guard a corner thereof and particularly to the lowermost corner of the rear vision mirror of a motor vehicle.

Another object of the invention resides in providing a guard including a cushion for application to the corner of the mirror.

A still further object of the invention resides in constructing said cushion in the shape of a sphere.

A still further object of the invention resides in providing a pair of gripping members, one of said members being attached to the cushion, said gripping members engaging the upper and lower edges of the mirror and being connected together through a resilient web disposed upon the back of the mirror.

Another object of the invention resides in constructing the web with a flap extending over the end of the mirror and in connecting said flap to said gripping members.

Other objects of the invention reside in the novel combination and arrangement of parts and in the details of construction hereinafter illustrated and/or described.

In the drawing:

Fig. 1 is a perspective view of a portion of a motor vehicle supporting the rear vision mirror and illustrating an embodiment of my invention applied thereto.

Fig. 2 is a perspective view of the guard detached from the rear vision mirror.

Fig. 3 is a sectional view taken on line 3—3 of Fig. 1 and drawn to a larger scale.

Fig. 4 is a plan sectional view taken on line 4—4 of Fig. 3.

Fig. 5 is a detailed sectional view taken on line 5—5 of Fig. 2.

The ordinary rear vision mirror used in motor vehicles is usually mounted at the front of the cab immediately above the windshield and is arranged at a slight angle so that the lowermost corner thereof projects appreciably into the interior of the cab. It frequently occurs that the occupants or passengers in arising strike their heads against the projecting corner of the rear vision mirror. The present invention provides a practical and efficient guard which may be attached to the rear vision mirror in such a manner as to guard such corner and to prevent injury to the passengers, in case they come in contact with the mirror.

For the purpose of illustrating the application of my invention, I have shown in Fig. 1 a portion of a motor vehicle which is indicated in its entirety by the reference character A. The part illustrated includes the body 10 and particularly the windshield 11 thereof and the header 12 immediately above the windshield and to which the rear vision mirror is attached.

The rear vision mirror is indicated at 13 and is rectangular in form, being provided with an upper edge 14, a lower edge 15 and an end 16. The end 16 and lower edge 15 form in conjunction a corner 17 which, when the mirror is arranged in the customary manner, projects outwardly into the interior of the cab proper. The mirror 13 is supported through any adjustable mounting 18 by means of which the same may be held in any desirable position. Where the driver is stationed at the left hand side of the cab the mirror 13 is usually inclined so that the corner 17 projects outwardly as stated. The present invention is designed to guard this corner and to prevent injury to the passengers who may forcibly engage the mirror in arising from their seats or moving about in the cab.

My invention proper consists of a guard which I have indicated in its entirety by the reference character B. This guard comprises a cushion 20 which is held in place upon the mirror 13 through two gripping members 21 and 22. Gripping member 21 is connected to the cushion 20 and the said gripping members are connected together through a resilient web 23. These parts will now be described in detail.

The cushion 20 is shown in detail in Fig. 5, and is constructed in the form of a knob preferably spherical in shape. This knob is provided at its center with an angular socket 24 adapted to receive the corner 17 of the mirror 13. Socket 24 if of a width substantially equal to, or slightly greater than the thickness of the mirror 13 so that the front and back walls 27 and 28 thereof overlie the front and rear sides of the mirror proper. The end walls 25 and 26 of the socket 24 are arranged at right angles to fit along the end 16 of the mirror and the lower edge 15 of the mirror whereby the cushion 20 is applied to the mirror in a manner to guard the lowermost projecting corner thereof.

The gripping member 21 is of channel shape being constructed with two spaced walls 30 and 31 forming a groove 29 therebetween. The width of the groove 29 is slightly less than the thickness of the mirror 13 so that when the lower edge 15 of the mirror is received within said groove the walls 30 and 31 engage the mirror and hold the said gripping member attached thereto.

Gripping member 21 is preferably integral with the cushion 20 and the groove 29 communicates with the socket 24 of said cushion member forming a continuation thereof.

The gripping member 22 is constructed in identically the same manner as the gripping member 21 being formed with two spaced walls 32 and 33 forming a groove 34 therebetween. Groove 34 faces the groove 29 and is adapted to receive the upper edge 14 of the mirror 13.

For the purpose of stiffening the two gripping members 21 and 22 and preventing the same from yielding when pressure is applied thereto to secure the guard to the rear vision mirror, the walls 31 and 33 of said gripping members are constructed with beads 37 and 38 which project outwardly therefrom. These beads in addition to performing the desired function serve to lend ornamentation to the guard and to enhance the appearance thereof.

The two gripping members 21 and 22 are connected together through the web 23 previously referred to. This web is preferably connected to the walls 30 and 32 of the said gripping members and is adapted to lie upon the rear surface of the mirror 13. Web 23 is of a length slightly less than the height of the mirror and as previously stated is constructed of resilient material so that the same becomes tensioned when applied to the mirror and thus operates to hold the two gripping members 21 and 22 applied to the mirror.

At the end of the web 23 adjacent the end 16 of the mirror 13 is formed a flap 35 which fits over the front surface of the mirror. This flap is spaced from the web 23 to form a groove 36 therebetween in which the end 16 of the mirror is received. Flap 35 is connected to both the gripping members 21 and 22 and is constructed flexible, the same as the web 23 so that the said flap will stretch with the web.

In the construction of the invention the entire device is preferably formed of rubber or some other similar suitable material. If desired, the cushion 20 may be separately constructed and attached to the remaining structure and the same may be formed of a different material than the remaining part of the invention. However, the web 23 and the flap 35 are both constructed of types of rubber having considerable resiliency so that the same may be stretched to accommodate the device to different sizes and types of mirrors.

The method of using the invention is as follows: All rear vision mirrors now in use are of practically the same dimensions, varying but a trifle in width and thickness, and a single guard constructed in accordance with my invention will fit practically all rear vision mirrors. The guard is applied to the mirror as follows: The guard is first placed so that the lower edge 15 of the mirror is in proximity to the groove 29 of gripping member 21. The guard is then slid along the mirror, the edge 15 being forced into the groove and into the socket 24 of cushion 20. The gripping member 21 is held in place upon the mirror through the friction afforded by the walls 30 and 31 thereof against the front and rear surfaces of the mirror. After the gripping member 21 has been applied the gripping member 22 is grasped and drawn away from the gripping member 21 which is readily accomplished due to the fact that web 23 and flap 35 are relatively thin and of a highly elastic material. When the gripping member 22 has been pulled away sufficiently to clear the edge 14, the same is brought over the said edge and the groove 34 caused to register with said edge. The edge 14 may then be worked into groove 34 and the entire guard shifted longitudinally of the mirror until the end 16 thereof is received within groove 29. The guard is then properly applied to the mirror. In the event that any of the occupants of the vehicle should forcibly engage the mirror, the cushion 20 cushions the impact and prevents injury to the person of the occupant.

My invention is highly advantageous in that an extremely simple and practical device is provided by means of which the exposed corner of a platelike member such as a rear vision mirror may be guarded to prevent injury to the occupant of the motor vehicle in which the mirror is used. The guard can be easily applied to existing structures and due to the resiliency of the web and flap connecting the gripping members may be applied to nearly all types and sizes of rear vision mirrors now in common use. The cushion of the guard is readily held in place through the gripping members which grip and support the structure in proper position. My invention is neat and attractive in appearance when applied to the mirror.

Changes in the specific form of my invention, as herein disclosed, may be made within the scope of what is claimed without departing from the spirit of my invention.

Having described my invention, what I claim as new and desire to protect by Letters Patent is:

1. A guard for application to the rear vision mirror of a motor vehicle, said guard comprising a cushion disposed at one of the lower corners of the mirror, two gripping members of channel shape having facing grooves for the reception of the upper and lower edges of the mirror, said lower gripping member being attached to the cushion, and a web connecting said members together, said web being disposed on the rear side of the mirror.

2. A guard for application to the rear vision mirror of a motor vehicle, said guard comprising a cushion disposed at one of the lower corners of the mirror, two gripping members of channel shape having facing grooves for the reception of the upper and lower edges of the mirror, said lower gripping member being attached to the cushion, a web connecting said gripping members together, said web being disposed on the rear side of the mirror, and a flap formed on the end of said web and overlying the end of the mirror.

3. A guard for application to the rear vision mirror of a motor vehicle, said guard comprising a cushion disposed at one of the corners of the mirror, two gripping members of channel shape having facing grooves for the reception of the upper and lower edges of the mirror, said cushion being attached to one of said members at its outer end, said members extending along the upper and lower edges of the mirror and terminating at their inner ends intermediate the lateral edges of the mirror, and a web extending between said members at their inner ends for connecting said members together.

4. A guard for application to the rear vision mirror of a motor vehicle, said guard comprising a cushion disposed at one of the corners of the mirror, two gripping members of channel shape having facing grooves for the reception of the upper and lower edges of the mirror, said cushion being attached to one of said members at its outer end, said members extending along the upper and lower edges of the mirror and terminating at their inner ends intermediate the lateral edges of the mirror, and a web extending between said members substantially throughout the entire length of said members.

5. A guard for application to the rear vision mirror of a motor vehicle, said guard comprising two gripping members of channel shape having facing grooves for the reception of the upper and lower edges of the mirror, said members extending along the upper and lower edges of the mirror and terminating at their inner ends intermediate the lateral edges of the mirror, and a web extending between said members at their inner ends for connecting said members together, said guard being constructed of a resilient material.

6. A guard for application to the rear vision mirror of a motor vehicle, said guard comprising two gripping members of channel shape having facing grooves for the reception of the upper and lower edges of the mirror, said members extending along the upper and lower edges of the mirror and terminating at their inner ends intermediate the lateral edges of the mirror, a web extending between said members at their inner ends for connecting said members together, and a flap connecting said members together at their outer ends, said flap extending along one of the edges of the mirror, said guard being constructed of resilient material.

NEIL H. BRADLEY.